(12) United States Patent
Taruya et al.

(10) Patent No.: US 7,846,307 B2
(45) Date of Patent: Dec. 7, 2010

(54) HIGH-PRESSURE HYDROGEN PRODUCTION APPARATUS

(75) Inventors: Kenji Taruya, Wako (JP); Masanori Okabe, Wako (JP); Koji Nakazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1185 days.

(21) Appl. No.: 11/431,212

(22) Filed: May 10, 2006

(65) Prior Publication Data

US 2006/0254907 A1    Nov. 16, 2006

(30) Foreign Application Priority Data

May 10, 2005    (JP)    ............... 2005-136810

(51) Int. Cl.
  C25B 9/00    (2006.01)
  C25B 1/02    (2006.01)
  C25B 1/04    (2006.01)

(52) U.S. Cl. ............. 204/242; 204/194; 204/229.7

(58) Field of Classification Search ............. 204/229.7, 204/194, 242
See application file for complete search history.

(56) References Cited

U.S. PATENT DOCUMENTS 7,048,839 B2 * 5/2006 Harada .................. 204/266

FOREIGN PATENT DOCUMENTS

| JP | 2001-131787 | 5/2001 |
|---|---|---|
| JP | 2002-173788 | 6/2002 |
| JP | 2005-97746 | 4/2005 |

OTHER PUBLICATIONS

Japanese Office Action for Application No. 2005-136810, dated Dec. 3, 2009.

* cited by examiner

*Primary Examiner*—Harry Wilkins
*Assistant Examiner*—Zulmariam Mendez
(74) *Attorney, Agent, or Firm*—Lahive & Cockfield, LLP; Anthony A. Laurentano

(57) ABSTRACT

The invention provides a high-pressure hydrogen production apparatus for preventing hydrogen gas from leaking toward an anode side and for obtaining excellent electrolytic efficiency. The apparatus includes a single cell having a solid polymer electrolyte membrane, power feeders, separators, and fluid channels provided in respective separators. High-pressure hydrogen gas accompanied by water is obtained in the fluid channel by supplying water to the fluid channel and applying current to each power feeder to electrolyze water. The obtained hydrogen gas and water are subjected to gas-liquid separation in a second compartment of a high-pressure vessel, and hydrogen gas thus separated is used to press a barrier member towards the single cell. The separated water is supplied to the fluid channel through the hydrogen gas guide channel.

5 Claims, 2 Drawing Sheets

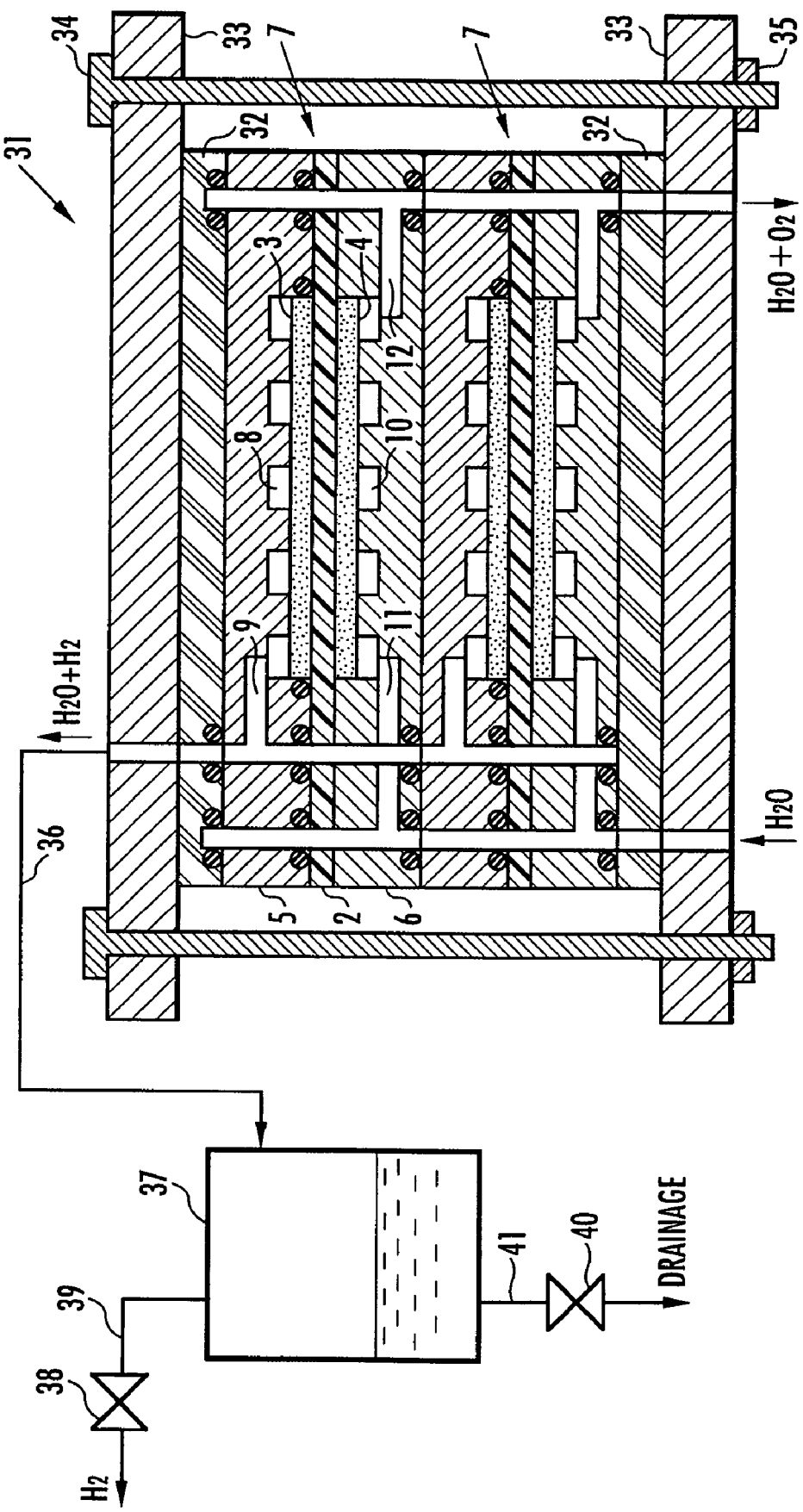

HIGH-PRESSURE HYDROGEN PRODUCTION APPARATUS

BACKGROUND OF THE INVENTION

1. Field of the Invention

The present invention relates to a hydrogen production apparatus, in which hydrogen is produced by the electrolysis of water.

2. Description of the Related Art

As shown in FIG. 2, there has conventionally been known a hydrogen production apparatus 31 comprising a plurality of single cells 7 being stacked on each other, in which each of the single cells 7 comprises: a solid polymer electrolyte membrane 2; a cathode side power feeder 3 and an anode side power feeder 4 which are provided opposed to each other on both sides of the electrolyte 2, respectively; and a cathode side separator 5 and an anode side separator 6 which are stacked on the power feeders 3, 4, respectively. Each side of the solid polymer electrolyte membrane 2 comprises a catalyst electrode layer which is not shown in FIG. 2.

The single cells 7, which have been stacked as described above, are sandwiched between end plates 33, 33 on both sides via insulating members 32, 32, and are securely fixed to the end plates 33, 33 by screwing a bolt 34 inserted through the end plates 33, 33 into a nut 35. As a result, each of the power feeders 3, 4 and each of the separators 5, 6 are pressed against the solid polymer electrolyte membrane 2.

In the hydrogen production apparatus 31 which is in a state that each of the power feeders 3, 4 and each of the separators 5, 6 are pressed against the solid polymer electrolyte membrane 2, once water is supplied to a fluid channel 10 of the anode side separator 6 while applying a current to the power feeders 3, 4, water which has been supplied to the fluid channel 10 is electrolyzed at the catalyst electrode layer provided on the anode side of the solid polymer electrolyte membrane 2, and then hydrogen ions, electrons, and oxygen gas are generated. The hydrogen ions accompanied by water molecules pass through the solid polymer electrolyte membrane 2 and move toward the cathode side, and then receive electrons from a catalyst electrode layer on the cathode side to convert to hydrogen gas. The hydrogen gas passes through the porous power feeder 3, and then moves into the fluid channel 8 of the cathode side separator 5.

The hydrogen gas which has been obtained in the fluid channel 8 is accompanied by water. Thus, the above described hydrogen gas is removed to an outside of the hydrogen production apparatus 31 from a hydrogen drawing port 9 which is in communication with the fluid channel 8, and then is introduced into a gas-liquid separator 37 through a hydrogen conducting line 36 in order to separate hydrogen gas from water by the gas-liquid separator 37 (see Japanese Patent laid-Open No. 2002-173788, for example).

The hydrogen gas which has been separated by the gas-liquid separator 37 can be removed from a hydrogen gas drawing port provided with an on-off valve 38. On the other hand, water which has been separated by the gas-liquid separator 37 is discharged from a drainage port 41 provided with an on-off valve 40.

However, the above described hydrogen production apparatus 31 has a disadvantage that the hydrogen gas leaks toward the anode side via the solid polymer electrolyte membrane 2, as a pressure of the hydrogen gas obtained on the cathode side of the solid polymer electrolyte membrane 2 becomes larger. The leakage of hydrogen gas toward the anode side is particularly significant when the hydrogen production apparatus 31 halts its operation.

SUMMARY OF THE INVENTION

An object of the present invention is to provide a high-pressure hydrogen production apparatus, in which hydrogen gas generated on a cathode side of a solid polymer electrolyte membrane is prevented from leaking toward an anode side via the solid polymer electrolyte membrane and in which an excellent electrolytic efficiency can be obtained by solving the above described disadvantage.

In order to achieve the above described object, a high-pressure hydrogen production apparatus according to the present invention has a single cell(s) comprising: a solid polymer electrolyte membrane; a cathode side power feeder and an anode side power feeder which are provided opposed to each other on both sides of the solid polymer electrolyte membrane, respectively; a cathode side separator and an anode side separator which are stacked on the power feeders, respectively; and a fluid channel which is provided in each of the separators and to which each of the power feeders is exposed, the high-pressure hydrogen production apparatus providing high-pressure hydrogen gas accompanied by water within the fluid channel of the cathode side separator, by supplying water to the fluid channel of the anode side separator, while applying a current to each of the power feeders, to electrolyze the water supplied to the fluid channel of the anode side separator, wherein the high-pressure hydrogen production apparatus comprises: a high-pressure vessel comprising a first compartment for housing said at least one single cell and a second compartment communicating with the first compartment on a cathode side of the single cell; a barrier member provided at an interface between the first compartment and the second compartment for water-tightly separating one of the compartments from the other, and provided retractably in the direction of the single cell along an inner wall of the second compartment; and a hydrogen gas guide channel provided within the high-pressure vessel for guiding the high-pressure hydrogen gas accompanied by water obtained in the fluid channel of the cathode side separator into the second compartment, and wherein the barrier member is pressed in the direction of the single cell by the high-pressure hydrogen gas separated in the second compartment by gas-liquid separation of the high-pressure hydrogen gas and water guided together through the hydrogen gas guide channel thereinto, while the water separated from the high-pressure hydrogen gas is supplied to the fluid channel of the cathode side separator through the hydrogen gas guide channel.

In the above described single cell which is housed in the first compartment of the high-pressure vessel according to the high-pressure hydrogen production apparatus of the present invention, water is supplied to the fluid channel of the anode side separator while applying a current to each of the power feeders. Consequently, water which has been supplied to the fluid channel is electrolyzed on the anode side of the solid polymer electrolyte membrane to generate hydrogen ions, electrons and oxygen gas. Then the hydrogen ions being accompanied by water molecules pass through the solid polymer electrolyte membrane and move toward the cathode side, and then receive electrons on the cathode side to convert to hydrogen gas. The hydrogen gas passes through the cathode side power feeder, and then moves toward the fluid channel of the cathode side separator.

Since the above described hydrogen gas is accompanied by water molecules, it is necessary to separate the hydrogen gas from water in order to commercially utilize the hydrogen gas. Thus, according to the high-pressure hydrogen production apparatus of the present invention, the hydrogen gas accompanied by the water molecules is guided from the fluid channel of the cathode side separator through the hydrogen gas guide channel into a second compartment, in which gas-liquid separation is performed to provide high-pressure hydrogen gas and water in a liquid state.

In this case, the first compartment and the second compartment of the high-pressure vessel are water-tightly separated from each other such that the above described high-pressure hydrogen gas and water in a liquid state never leak out from the second compartment into the first compartment. Consequently, the barrier member is pressed in the direction of the single cell by the use of the high-pressure hydrogen gas.

In the above described single cell, the cathode side power feeder and the cathode side separator are pressed in a direction of moving away from the solid polymer electrolyte membrane with the increase of a pressure of hydrogen gas which is generated on the cathode side of the solid polymer electrolyte membrane, and thus a gap may be created between the solid polymer electrolyte membrane and the cathode side power feeder or the cathode side separator. If the gap is created, an electrolytic efficiency will be decreased because of an increase in the electrolytic voltage and a leakage of the hydrogen gas, for example.

According to the high-pressure hydrogen production apparatus of the present invention, however, a pressure of hydrogen gas obtained in the second compartment counteracts a pressure of hydrogen gas generated on the cathode side of the solid polymer electrolyte membrane, and thus the barrier member is pressed in the direction of the single cell as described above. Consequently, it is possible to prevent the gap from being created and to obtain an excellent electrolytic efficiency.

In addition, according to the high-pressure hydrogen production apparatus of the present invention, water in a liquid state which has been separated in the second compartment is supplied to the fluid channel of the cathode side separator through the hydrogen gas guide channel. This water in a liquid state penetrates into the cathode side power feeder from the fluid channel in order to coat the cathode side of the solid polymer electrolyte membrane, and consequently, the hydrogen gas generated on the cathode side of the solid polymer electrolyte membrane is inhibited from coming into contact with the solid polymer electrolyte membrane.

Therefore, the high-pressure hydrogen production apparatus of the present invention ensures that hydrogen gas created on a cathode side of the solid polymer electrolyte membrane is prevented from leaking into an anode side through the solid polymer electrolyte membrane.

Further, it is also preferable that the high-pressure hydrogen production apparatus of the present invention comprises auxiliary pressing means for pressing the barrier member in the direction of the single cell in cooperation with the hydrogen gas. Provision of the auxiliary pressing means ensures that, even when a pressure of hydrogen gas generated on a cathode side of the solid polymer electrolyte membrane is increased, a gap is prevented from being created between the cathode side power feeder or the cathode side separator and the solid polymer electrolyte membrane while counteracting the above described pressure.

As the above described auxiliary pressing means, it is possible to use an elastic body, examples of which include a disc spring, a coiled spring and the like.

BRIEF DESCRIPTION OF THE DRAWINGS

FIG. 2 is an illustrative sectional view showing an example of a conventional hydrogen production apparatus.

DETAILED DESCRIPTION OF THE PREFERRED EMBODIMENTS

Figure 1:
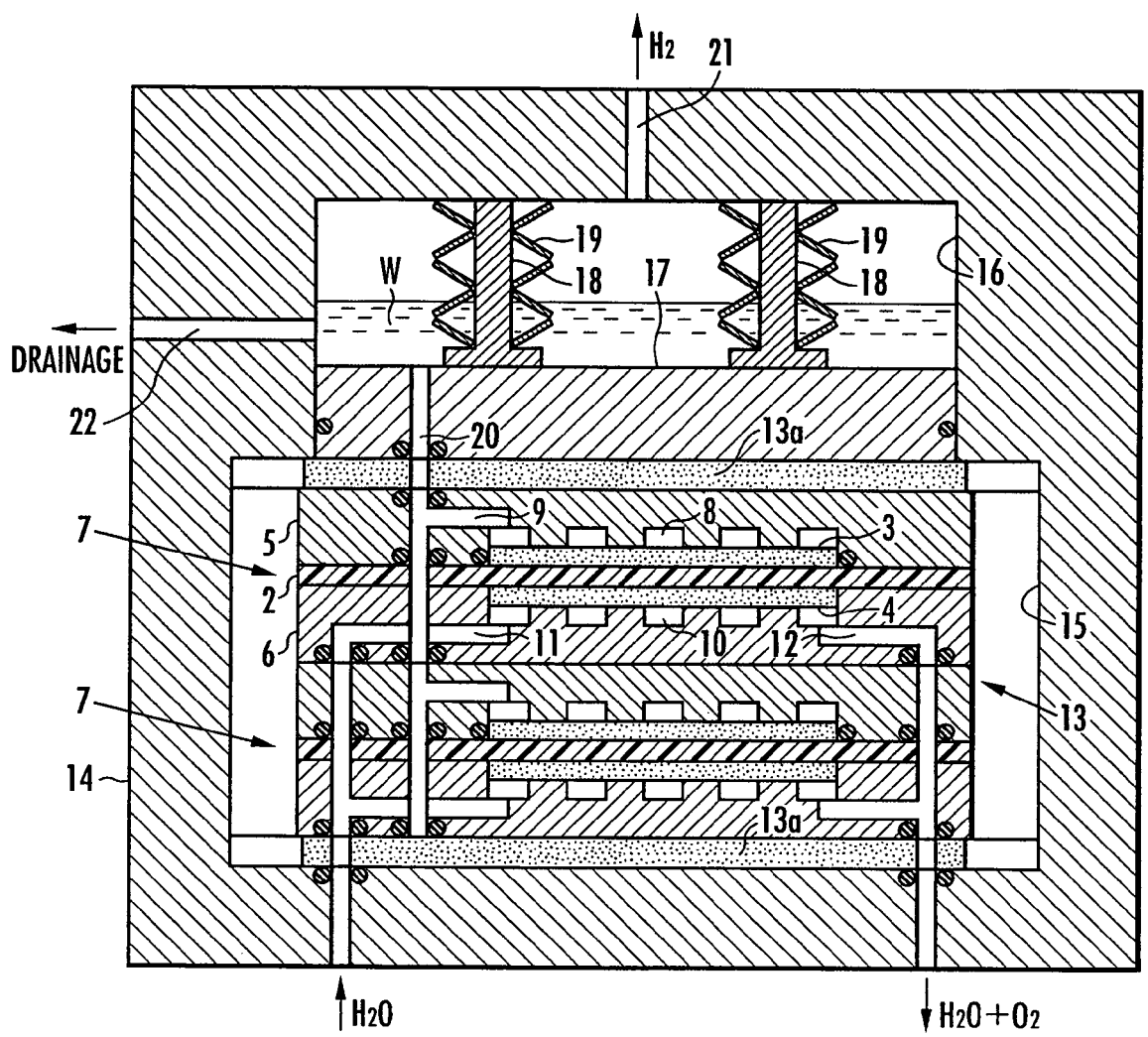
FIG. 1 is an illustrative sectional view showing an embodiment of a high-pressure hydrogen production apparatus according to the present invention.

Embodiments of the present invention will now be further described in detail with reference to accompanying drawings.

As shown in FIG. 1, a high-pressure hydrogen production apparatus 1 of the present embodiment comprises a single cell 7 which includes a solid polymer electrolyte membrane 2; a cathode side power feeder 3 and an anode side power feeder 4 which are provided opposed to each other on both sides of the solid polymer electrolyte membrane 2, respectively; and a cathode side separator 5 and an anode side separator 6 which are stacked on the power feeders 3, 4, respectively. In this single cell 7, the cathode side power feeder 3 and the cathode side separator 5 are stacked on an upper side of the solid polymer electrolyte membrane 2, while the anode side power feeder 4 and the anode side separator 6 are stacked on a lower side of the solid polymer electrolyte membrane 2. The cathode side separator 5 comprises a fluid channel 8 to which the cathode side power feeder 3 is exposed and a hydrogen drawing port 9 which is in communication with the fluid channel 8, and the anode side separator 6 comprises a fluid channel 10 to which the anode side power feeder 4 is exposed, a water supplying port 11 which is in communication with one end of the fluid channel 10, and a drainage port 12 which is in communication with the other end of the fluid channel 10.

In this high-pressure hydrogen production apparatus 1, two single cells 7 are stacked on each other to form a two-layered stack 13, in which the anode side separator 6 of one single cell 7 is stacked on the cathode side separator 5 of the other single cell 7. Although each of the power feeders 3, 4 is adapted to be energized via each of the separators 5, 6, this structure is advantageous because the respective single cells 7, 7 are connected in series such that an anode side separator 6 of one single cell 7 is stacked on a cathode side separator 5 of the other single cell 7 as described above.

The stack 13 is housed in a stack compartment (corresponding to a first compartment of the present invention) 15, which is provided inside a high-pressure vessel 14, between two insulators 13a disposed in upper and lower sides of the stack 13, respectively, and the water supplying port 11 and the drainage port 12, respectively pass through the high-pressure vessel 14 so as to be in communication with the outside. An upper portion of the stack compartment 15 is in communication with a cylinder compartment (corresponding to a second compartment of the present invention) 16, and there is provided a piston 17 as a barrier member for water-tightly separating the compartments 15, 16 from each other at an interface between the stack compartment 15 and the cylinder compartment 16. In this case, a cross-sectional area of the piston 17 is required to be equal to or larger than an area of a hydrogen gas production region of the single cell 7 (a cross-sectional area of the cathode side power feeder 3), and is identical to a cross-sectional area of the cathode side power feeder 3, for example.

A piston rod 18 is attached to a cylinder compartment 16 side of the piston 17, and this piston 17 is pressed against the cathode side separator 5 of the single cell 7 which forms an upper layer of the stack 13, by using a disc spring 19 as the auxiliary pressing means disposed around the piston rod 18. The piston 17 also comprises a flow-through channel 20 as the hydrogen gas guide channel for guiding the hydrogen gas obtained in the fluid channel 8 of the cathode side separator 5 into the cylinder compartment 16. One end of the flow-through channel 20 is in communication with the hydrogen drawing port 9, while the other end of the flow-through channel 20 is opened into the cylinder compartment 16.

The cylinder compartment 16 is provided with a high-pressure hydrogen drawing port 21 which passes through an upper wall of this compartment, and this high-pressure hydrogen drawing port 21 allows high-pressure hydrogen-gas within the cylinder compartment 16 to be freely removed by opening an on-off valve which is not shown in FIG. 1. In addition, the cylinder compartment 16 also comprises a gas-liquid separation water drainage port 22 which passes through a side wall of this compartment 16, and this gas-liquid separation water drainage port 22 allows gas-liquid separation water within the cylinder compartment 16 to be freely removed by opening an on-off valve which is not shown in FIG. 1.

In the high-pressure hydrogen production apparatus 1, the solid polymer electrolyte membrane 2 is a cation-permeable membrane, and thus it is possible to use Nafion (Registered Trademark, manufactured by DuPont Co.), Aciplex (Brand Name, manufactured by Asahi Kasei Corp.) and the like. The solid polymer electrolyte membrane 2 comprises an electrode catalyst layer containing a $RuIrFeO_x$ catalyst (not shown) for example on the anode side, and also comprises an electrode catalyst layer containing a platinum catalyst (not shown) for example on the cathode side.

Each of the cathode side power feeder 3 and the anode side power feeder 4 is made of a porous body comprised of a titanium powder sintered body. And each of the cathode side separator 5 and the anode side separator 6 is made of a titanium plate.

Next, operation of the high-pressure hydrogen production apparatus 1 in the present embodiment will be described.

In the high-pressure hydrogen production apparatus 1 in its initial condition, the piston 17 is pressed against the cathode side separator 5 by the disc spring 19 as the auxiliary pressing means, and consequently, each of the power feeders 3, 4 and each of the separators 5, 6 are pressed against the solid polymer electrolyte membrane 2 so as to be in intimate contact with each other. A pressing force exerted by the disc spring 19 is set within a range of 4 to 10 MPa, and is set at 5 MPa for example.

In this state, once water is supplied from the water supplying port 11 to the fluid channel 10 of the anode side separator 6 while applying a current to the power feeders 3, 4, water which has been supplied to the fluid channel 10 is electrolyzed at the catalyst electrode layer provided on the anode side of the solid polymer electrolyte membrane 2, and then hydrogen ions, electrons, and oxygen gas are generated. The hydrogen ions being accompanied by water molecules pass through the solid polymer electrolyte membrane 2 and move toward the cathode side, and then receive electrons from the catalyst electrode layer provided on the cathode side to convert to hydrogen gas. The hydrogen gas passes through the power feeder 3, and then moves into the fluid channel 8 of the cathode side separator 5.

Although hydrogen gas obtained in the fluid channel 8 is accompanied by water molecules as described above, the high-pressure hydrogen production apparatus 1 performs gas-liquid separation in the cylinder compartment 16 after introducing the hydrogen gas into the cylinder compartment 16 from the hydrogen drawing port 9 which is in communication with the fluid channel 8 via the flow-through channel 20 provided in the piston 17. At this point, both of the on-off valves provided at the high-pressure hydrogen drawing port 21 and the gas-liquid separation water drainage port 22 (not shown) are closed.

The above described hydrogen gas introduced into the cylinder compartment 16 is subjected to gas-liquid separation which is caused by the action of gravity, and thus gas-liquid separation water W is reserved in a bottom part of the cylinder compartment 16 while hydrogen gas is reserved above the gas-liquid separation water W. Since a pressure of the hydrogen gas is exerted on the piston 17 via gas-liquid separation water W, the piston 17 is pressed in a direction of the stack 13 by a resultant force obtained from the composition of a pressing force of the disc spring 19 and a pressure of the hydrogen gas.

Although a pressure of hydrogen gas within the cathode side power feeder 3 of each of the single cells 7 gradually increases as the above described electrolysis proceeds, a pressure of hydrogen gas within the cylinder compartment 16 also concurrently becomes larger as the above described electrolysis proceeds, and thus both pressures described above cancel out each other if a cross-sectional area of the piston 17 is identical to a cross-sectional area of the cathode side power feeder 3. Therefore, each of the power feeders 3, 4 and each of the separators 5, 6 of each of the single cells 7 are to be always pressed against the solid polymer electrolyte membrane 2 by a pressing force from 4 to 10 MPa exerted from the disc spring 19 regardless of a pressure of the above described hydrogen gas, and consequently are held in intimate contact with the solid polymer electrolyte membrane 2. As a result, the high-pressure hydrogen production apparatus 1 provides an excellent electrolytic efficiency without increasing an electrolytic voltage during the course of the electrolysis.

On the other hand, gas-liquid separation water W reserved in the cylinder compartment 16 is supplied to the fluid channel 8 of the cathode side separator 5 of each of the single cells 7 via the flow-through channel 20 and the hydrogen drawing port 9, that is, the route opposite to that of the above described hydrogen gas. The gas-liquid separation water W permeates through the cathode side power feeder 3 which is exposed to the fluid channel 8, and then coats a surface of the cathode side of the solid polymer electrolyte membrane 2 with a water layer (not shown). Consequently, hydrogen gas generated on the cathode side of the solid polymer electrolyte membrane 2 is prevented from coming into contact with the solid polymer electrolyte membrane 2 in the presence of the water layer, which result in the prevention of hydrogen gas leakage toward the anode side through the solid polymer electrolyte membrane 2.

Next, an amount of hydrogen gas generated on the cathode side of the solid polymer electrolyte membrane 2 which has leaked toward the anode side when using the high-pressure hydrogen production apparatus 1 was compared with that obtained when using the conventional hydrogen production apparatus 31 as shown in FIG. 2. Although a surface of the cathode side of the solid polymer electrolyte membrane 2 is coated with the water layer as described above in the case of the high-pressure hydrogen production apparatus 1, the conventional hydrogen production apparatus 31 does not comprise a water layer which coats a surface of the cathode side of the solid polymer electrolyte membrane 2. Electrolysis conditions are set at an electrolytic current of 1 $A/cm^2$ and a temperature of 30° C.

Under such conditions, the above described leakage amount in the case of the conventional hydrogen production apparatus 31 was 0.2 $ml/min\text{-}cm^2$, while the above described leakage amount in the case of the high-pressure hydrogen production apparatus 1 of the present embodiment was 0.01 $ml/min\text{-}cm^2$ or less. Therefore, it is apparent that the high-pressure hydrogen production apparatus 1 of the present embodiment can significantly decrease the hydrogen gas leakage toward the anode side by the use of the water layer.

In addition, the high-pressure hydrogen production apparatus 1 of the present embodiment can also produce an effect of downsizing thereof, since hydrogen gas generated is subjected to gas-liquid separation by the use of the cylinder compartment 16 which has been provided above the stack 13, and there is no need to provide an additional gas-liquid separator.

Although, in the present embodiment, a cross-sectional area of the piston 17 is adapted to be identical to an area of the hydrogen gas generation region in each single cell 7 (a cross-sectional area of the cathode side power feeder 3) such that a pressure of hydrogen gas within the cylinder compartment 16 counteracts a pressure of hydrogen gas within the cathode side power feeder 3 of each single cell 7, the cross-sectional area of the piston 17 may also be larger than the cross-sectional area of the cathode side power feeder 3. Consequently, the piston 17 can be pressed in a direction of the stack 13 by the pressure of hydrogen gas within the cylinder compartment 16, while counteracting the pressure of hydrogen gas within the cathode side power feeder 3 of each single cell 7. Therefore, the piston 17 is pressed in a direction of the stack 13 by a resultant force obtained from the composition of a pressing force of the disc spring 19 and a pressure of hydrogen gas within the cylinder compartment 16, and thus it further ensures that each of the power feeders 3, 4 and each of the separators 5, 6 are held in intimate contact with the solid polymer electrolyte membrane 2.

Further, although the piston 17 of the present embodiment is adapted to be pressed by the disc spring 19, other elastic bodies such as a coiled spring may also be used instead of the disc spring 19.

In addition, although the present embodiment describes the stack 13 in which two single cells 7 are staked on each other, the single cell 7 may also be a single-layered structure, and further may also be a three- or more-layered structure.

What is claimed is:

1. A high-pressure hydrogen production apparatus equipped with a single cell comprising:
    a solid polymer electrolyte membrane;
    a cathode side power feeder and an anode side power feeder which are provided opposed to each other on both sides of the solid polymer electrolyte membrane, respectively;
    a cathode side separator and an anode side separator which are stacked on the power feeders, respectively; and
    a fluid channel which is provided in each of the separators and to which each of the power feeders is exposed, the high-pressure hydrogen production apparatus providing high-pressure hydrogen gas accompanied by water within the fluid channel of the cathode side separator, by supplying water to the fluid channel of the anode side separator, while applying a current to each of the power feeders, to electrolyze the water supplied to the fluid channel of the anode side separator,
    wherein the high-pressure hydrogen production apparatus comprises:
    a high-pressure vessel comprising a first compartment for housing said at least one single cell and a second compartment communicating with the first compartment on a cathode side of the single cell;
    a barrier member provided at an interface between the first compartment and the second compartment for water-tightly separating one of the compartments from the other, and provided retractably in the direction of the single cell along an inner wall of the second compartment; and
    a hydrogen gas guide channel provided within the high-pressure vessel for guiding the high-pressure hydrogen gas accompanied by water obtained in the fluid channel of the cathode side separator into the second compartment, and
    wherein the barrier member is pressed in the direction of the single cell by the high-pressure hydrogen gas separated in the second compartment by gas-liquid separation of the high-pressure hydrogen gas and water guided together through the hydrogen gas guide channel thereinto, while the water separated from the high-pressure hydrogen gas is supplied to the fluid channel of the cathode side separator through the hydrogen gas guide channel.

2. The high-pressure hydrogen production apparatus according to claim 1, comprising auxiliary pressing means for pressing said barrier member in the direction of said single cell in cooperation with said hydrogen gas.

3. The high-pressure hydrogen production apparatus according to claim 2, wherein said auxiliary pressing means is a disc spring or a coiled spring.

4. The high-pressure hydrogen production apparatus according to claim 3, wherein said disc spring provides a pressing force within a range of 4 to 10 MPa.

5. The high-pressure hydrogen production apparatus according to claim 1, wherein said first compartment houses a plurality of said single cells.

* * * * *